US012658166B2

(12) United States Patent
Treacher

(10) Patent No.: US 12,658,166 B2
(45) Date of Patent: Jun. 16, 2026

(54) MUSICAL INSTRUMENT STAND

(71) Applicant: Roger Treacher, Lake Kiowa, TX (US)

(72) Inventor: Roger Treacher, Lake Kiowa, TX (US)

(*) Notice: Subject to any disclaimer, the term of this patent is extended or adjusted under 35 U.S.C. 154(b) by 437 days.

(21) Appl. No.: 17/141,771

(22) Filed: Jan. 5, 2021

(65) Prior Publication Data

US 2021/0210055 A1 Jul. 8, 2021

Related U.S. Application Data

(60) Provisional application No. 62/957,424, filed on Jan. 6, 2020.

(51) Int. Cl.
*G10G 5/00* (2006.01)
*G10D 13/09* (2020.01)
*G10H 1/32* (2006.01)

(52) U.S. Cl.
CPC ............. *G10G 5/005* (2013.01); *G10D 13/09* (2020.02); *G10H 1/32* (2013.01)

(58) Field of Classification Search
CPC ........... G10G 5/005; G10D 13/09; G10H 1/32
USPC ............................................................ 84/718
See application file for complete search history.

(56) References Cited

U.S. PATENT DOCUMENTS 2,678,859 A * 5/1954 Zuzzi ..................... A47B 27/02 248/405
3,203,670 A * 8/1965 Farris ........................ B66F 7/08 108/120
3,282,566 A * 11/1966 Clarke .................... B66F 7/065 108/147.22
3,404,791 A * 10/1968 Larson .................... B66F 7/065 414/373
3,796,282 A * 3/1974 Denier ...................... E04G 1/22 52/109
4,097,941 A * 7/1978 Merkel ................ A61G 1/0231 108/147.22
4,691,611 A * 9/1987 May ....................... G10D 13/02 984/150
4,770,380 A * 9/1988 Eason ...................... G10H 1/32 984/344
4,848,207 A * 7/1989 Kawai ...................... G10G 5/00 984/155
4,881,442 A * 11/1989 Stevens .................. G10D 13/08 984/155
5,161,761 A * 11/1992 May ......................... G10H 1/32 84/DIG. 12
5,174,223 A * 12/1992 Nagy ................... A47B 83/001 108/50.01
5,211,265 A * 5/1993 Gregg ..................... B66F 7/065 187/218
5,322,143 A * 6/1994 Curran ...................... B66F 7/08 280/47.27

(Continued)

FOREIGN PATENT DOCUMENTS

CN 112466263 A * 3/2021 ........... A47B 19/002
CN 113040571 A * 6/2021 ............... A47F 5/12

(Continued)

*Primary Examiner* — Christina M Schreiber
(74) *Attorney, Agent, or Firm* — Elman IP; Gerry J. Elman

(57) ABSTRACT

A musical instrument stand capable of adjusting its height by operation of at least one linear actuator controlled by a control box element that is directed by a control pad element used by a performer to adjust the height of the musical support stand to a height desired by the performer.

18 Claims, 3 Drawing Sheets

(56) References Cited

U.S. PATENT DOCUMENTS

| | | | | | |
|---|---|---|---|---|---|
| 5,400,720 | A * | 3/1995 | Stevens | A47B 9/16 248/420 |
| 5,408,940 | A * | 4/1995 | Winchell | A47B 9/06 108/147 |
| 5,467,953 | A * | 11/1995 | Malizia | F16M 11/38 248/164 |
| 5,476,050 | A * | 12/1995 | Zimmer | B66F 11/042 254/122 |
| 5,483,903 | A * | 1/1996 | Pierce | A47B 9/20 108/108 |
| 5,588,377 | A * | 12/1996 | Fahmian | A47B 9/16 248/164 |
| 5,695,173 | A * | 12/1997 | Ochoa | B66F 7/065 254/9 C |
| 5,857,649 | A * | 1/1999 | Eason | G10H 1/32 248/164 |
| 5,915,659 | A * | 6/1999 | Scannell, Jr. | A47B 19/06 248/371 |
| 5,937,764 | A * | 8/1999 | Olivier | A47B 11/00 108/20 |
| 5,984,245 | A * | 11/1999 | Hsu | F16M 11/38 248/164 |
| 6,096,955 | A * | 8/2000 | Ter Heide | G10G 5/00 84/421 |
| 6,286,441 | B1 * | 9/2001 | Burdi | A47B 9/00 108/147 |
| 6,696,628 | B2 * | 2/2004 | Yoshida | G10G 5/00 84/321 |
| 8,525,009 | B2 * | 9/2013 | Stevens | G10D 13/08 84/402 |
| 10,109,263 | B1 * | 10/2018 | Fugate | G10D 13/08 |
| 2003/0024446 | A1 * | 2/2003 | Lanphear | A47B 9/20 108/147 |
| 2003/0029299 | A1 * | 2/2003 | Yoshida | G10D 13/08 84/327 |
| 2004/0112197 | A1 * | 6/2004 | Morgan | G10D 13/08 84/327 |
| 2005/0121564 | A1 * | 6/2005 | Johnson | F16M 11/18 248/125.1 |
| 2005/0121565 | A1 * | 6/2005 | Johnson | F16M 11/18 248/125.1 |
| 2008/0086816 | A1 * | 4/2008 | Farooqui | F16M 11/42 5/601 |
| 2016/0148601 | A1 * | 5/2016 | Glowka | G10D 13/08 84/404 |
| 2018/0247621 | A1 * | 8/2018 | Yamakoshi | G10G 5/005 |
| 2021/0210055 | A1 * | 7/2021 | Treacher | G10D 13/09 |

FOREIGN PATENT DOCUMENTS

| | | | | |
|---|---|---|---|---|
| DE | 4225975 | C1 * | 8/1993 | F16M 11/046 |
| EP | 3367377 | A1 * | 8/2018 | G10G 5/00 |
| GB | 2162815 | A * | 2/1986 | E04F 21/1811 |
| GB | 2564438 | A * | 1/2019 | G10D 13/08 |
| GB | 2564652 | A * | 1/2019 | G10D 13/08 |
| JP | H0662925 | A * | 3/1994 | F15B 11/22 |

* cited by examiner

MUSICAL INSTRUMENT STAND

CROSS REFERENCE TO RELATED APPLICATIONS

This application claims the benefit of priority of Provisional Application Ser. No. 62/957,424 filed on Jan. 6, 2020 and that application is incorporated by reference as if fully stated herein in its entirety and for all beneficial purposes.

STATEMENT REGARDING FEDERALLY SPONSORED RESEARCH

Not Applicable.

BACKGROUND OF THE INVENTION

Marimbas, vibraphone, and xylophones are acoustic musical instruments played by a performer that stands alongside the instrument when playing it. These instruments can weigh up to 250 pounds and are generally mounted on height adjustable frames.

There are currently three mechanical alternatives on the market that provide height adjustment for a frame that supports a musical instrument. The most common is a method using a locking bolt or pull-out pin. In that version, the performer manually lifts upward on the musical instrument to release the weight of the musical instrument that was residing upon a locking bolt or pull-out pin built into the stand upon which the instrument is residing. A helper then releases the locking bolt or pull-out pin and that allows the performer to then manually raise or lower the heavy musical instrument. When the performer has adjusted the musical instrument to the playing height the performer desires, the helper then tightens the locking bolt or reinserts the pull-out pin to maintain the musical instrument at that height on its mounting stand. This procedure must be repeated each time a performer wishes to adjust the height of the musical instrument.

The second current method of adjusting the height of a similar musical instrument utilizes a crank handle on the instrument mounting stand. This crank handle is positioned at one or both ends of the support stand. If one handle is utilized, it is operatively connected to the other end of the same support stand. To adjust the height of the musical instrument in this version, the crank handles are rotated to engage and operate a system of rods and gears to either raise the stand when the crank handles are turned one direction or lower the stand when the crank handles are rotated in the opposite direction. This operation requires manual effort and does not store any of the selected heights for future reference.

In the third current method of adjusting the height of a similar musical instrument, a pneumatic system incorporates a pneumatic/gas strut that is disposed on at least one side of the musical instrument to support the weight of the instrument. The musical instrument is retained in that lowered position because the pneumatic/gas strut is held at that position by a mechanical lock that prevents the strut from lifting the musical instrument higher. If it is desired to relocate the musical instrument at a higher position, the mechanical lock is released and the pneumatic/gas strut will raise the musical stand to a higher position. To lower musical instrument from its higher position, the instrument must be manually pushed down against the upward pressure of the pneumatic/gas strut and once the musical instrument is in its lowered position, the musical instrument can be retained at that lower position by re-engaging the mechanical lock. This process can be repeated on each side of the instrument when the embodiment includes a pneumatic/gas strut on each side of the musical instrument.

These types of current instrument stands have a restricted method for adjusting the height of the percussion instrument often result in significant efforts to adjust the height of the percussion instrument as needed for a specific musician. Those efforts are tedious and time-consuming. Additionally, those height adjustments methods do not store the height selected by the performer and that requires the instrument stand to be constantly re-adjusted to meet the new requirements of a different musician that must play the percussion instrument. Finally, in some cases, the final height adjustment made for each musician tends to become out of adjustment during the time the percussion instrument is being played by the musician. That requires virtually continuous and often untimely adjustments that must be made—even during the musical performance of the musician.

It would be desirable to have a musical instrument stand that is capable of carrying the heavy loads found in a marimba, vibraphone, and xylophone that includes a quick and effortless method of fixedly adjusting the height of the musical instrument stand while including preset heights for the musical instrument stand that could be rapidly accessed by the performer.

SUMMARY OF THE INVENTION

This section provides a general summary of the disclosure, and is not a comprehensive disclosure of its full scope or all of its features. Embodiments of the present Musical Instrument Stand that provide quick and repeatable adjustments to the height of the Musical Instrument Stand resting upon the percussion instrument stand.

Preferred embodiments of the present Musical Instrument Stand allow height adjustment via one or two linear actuators that are operated to adjust the height of the musical instrument to suit the needs of performer's specific application. Various embodiments of the present invention provide a device capable adjusting the height of the musical instrument and then saving a particular height for the musical instrument that matches the specific needs of an individual musician while preserving similar specific heights for other musicians that might also play the musical instrument at different times. In certain embodiments the method of adjusting the height of the Musical Instrument Stand is accomplished by using a control pad element having a plurality of switches that can be activated by the operator to modify the height of the musical instrument.

In accordance with the various embodiments of the present invention, this invention relates to Musical Instrument Stand that provides quick and repeatable height adjustments to a stand for supporting various types of musical instruments.

DESCRIPTION OF THE DRAWINGS

In the accompanying drawings which form part of the specification.

Corresponding reference numerals indicate corresponding steps or parts throughout the several figures of the drawings.

Figure 1:
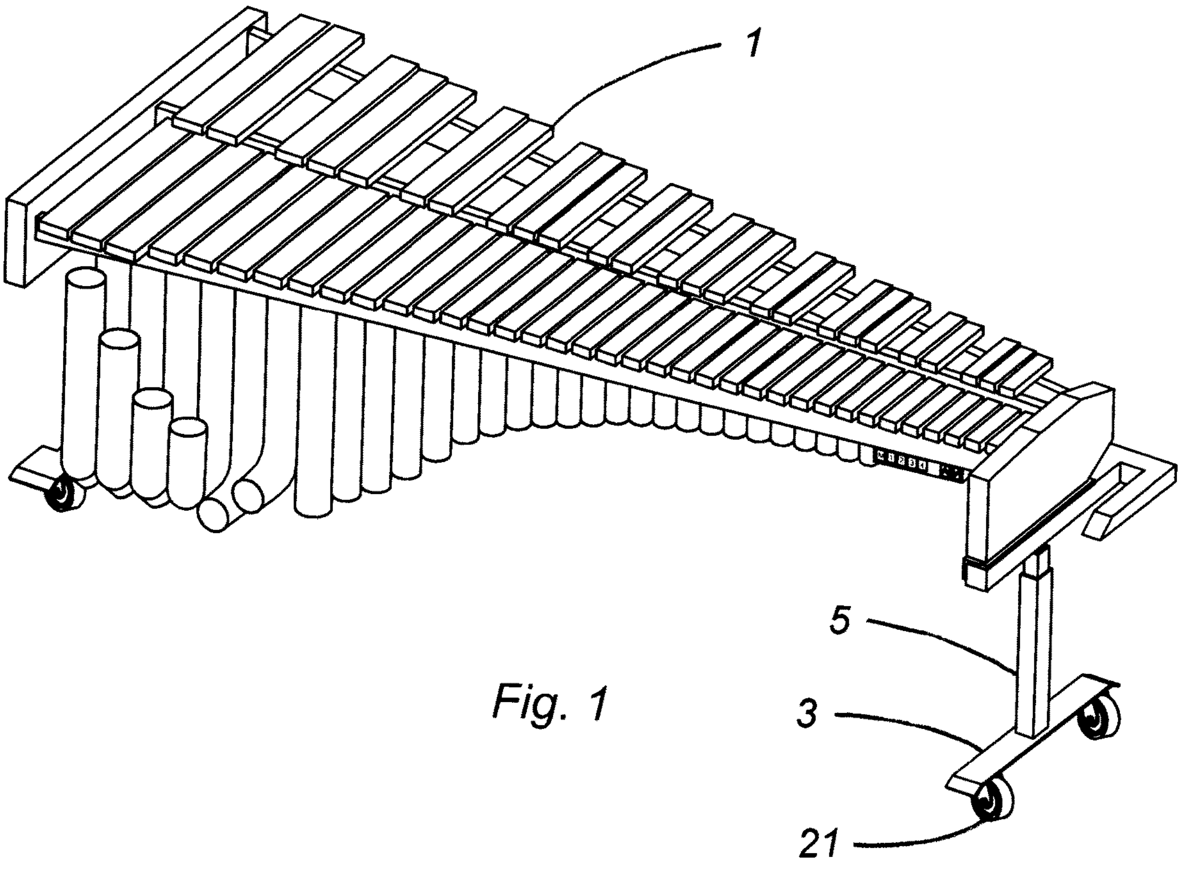
FIG. 1 is a perspective view of one preferred embodiment of the present invention.

While specific embodiments of the present invention are illustrated in the above referenced drawings and in the following description, it is understood that the embodiments shown are merely some examples of various preferred embodiments and are offered for the purpose of illustration only, and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF AT LEAST ONE PREFERRED EMBODIMENT OF THE INVENTION

In the following description, numerous specific details are set forth such as examples of some preferred embodiments, specific components, devices, and methods, in order to provide a thorough understanding of embodiments of the present disclosure. It will be apparent to a person of ordinary skill in the art that these specific details need not be exclusively employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill.

One preferred embodiment of the present invention is for a Musical Instrument Stand A that can adjust the height of an instrument disposed upon the Musical Instrument Stand A. This adjustment allows the height of the Musical Instrument Stand to be adjusted to fit the particular height desired by the musician playing the musical instrument disposed upon the Musical Instrument Stand A. It is understood that the general adjustment of the height of the Musical Instrument Stand A is accomplished by the incorporation of an actuator operatively disposed on at least one leg of the Musical Instrument Stand A. The actuator allows the upper mounting surface of the Musical Instrument Stand A to raised or lowered until a preferred height is selected. Other elements of the Musical Instrument Stand A are included that allow a plurality of preselected heights to be saved and later recalled to locate the Musical Instrument Stand A to any of those preselected heights. Yet other embodiments of the Musical Instrument Stand A include a plurality of actuators operatively disposed in more than one leg of the Musical Instrument Stand A.

At least one preferred embodiment of the present invention is illustrated in the drawings and figures contained within this specification. More specifically, certain preferred embodiments of the present invention are generally disclosed and described in FIGS. 1-4.

Figure 2:
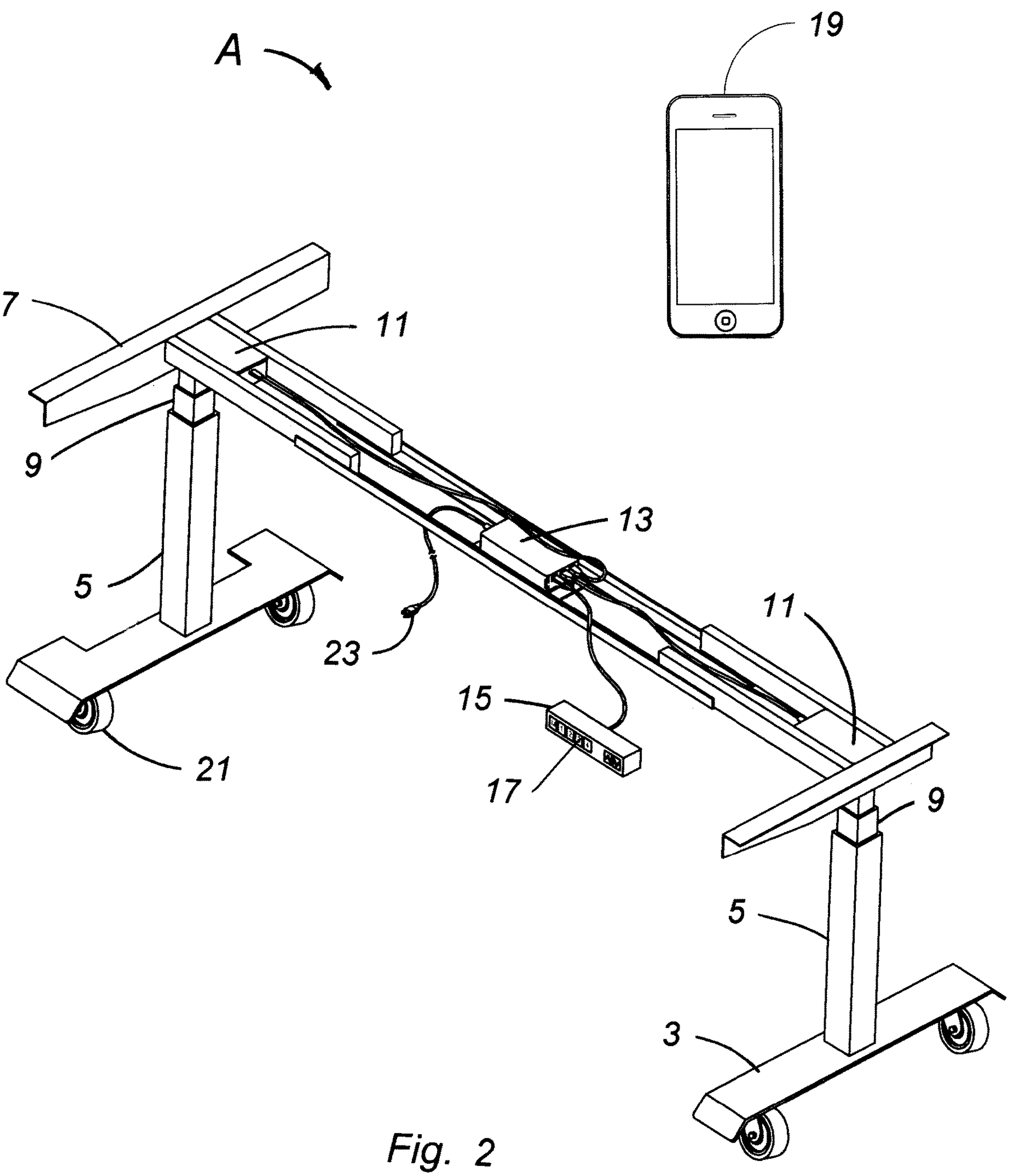
FIG. 2 is a perspective view of a support frame system for one embodiment of the present invention.
Figure 3:
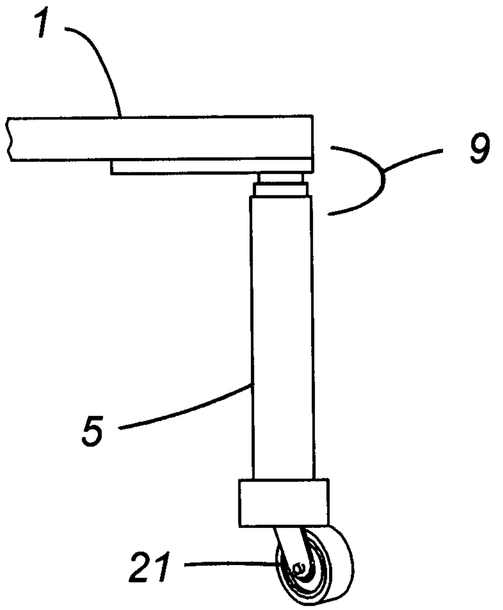
FIG. 3 is a partial front view of one retracted telescoping leg of one embodiment of the present invention.
Figure 4:
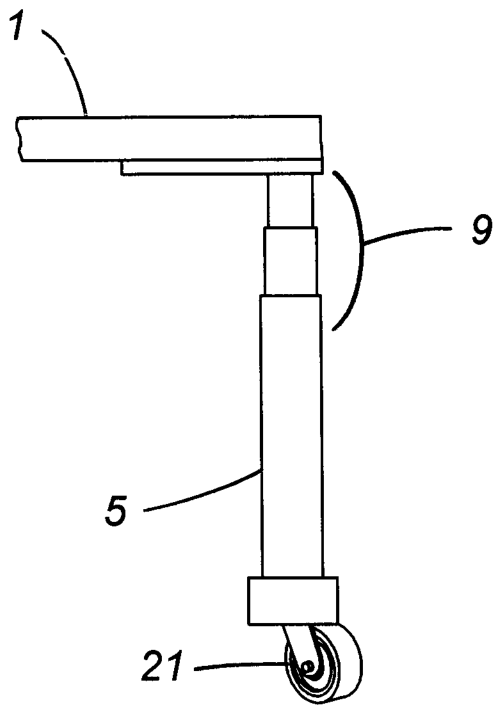
FIG. 4 is a partial front view of one extended telescoping leg of one embodiment of the present invention.

Referring now to the Figures, FIG. 1 shows at least one preferred embodiment of the present invention of a Musical Instrument Stand A wherein a marimba 1 has been mounted to the support stand 3. FIG. 2 shows the support stand 3 and two support legs 5 located at each end of the upper frame 7 of the support stand. Each of the two support legs 5 includes a telescoping system 9 that includes at least one actuator 11. It is appreciated that operation of the at least one actuator 11 functions to locate and relocate the various elements of the telescoping system 9 in a manner that either raises or lowers the height of the Musical Instrument Stand A. It is understood that the actuator 11 of the present embodiment is an electrical linear actuator and that other types of actuators may also be incorporated and used within alternative embodiments of the present invention and still remain within the intended scope of the claims of the invention. For example, hydraulic actuators, AC electric actuators, DC electric actuators, inline actuators, right angle actuators, vertical lift actuators, and gear motor actuators may also be used in alternative embodiments as long as the type of actuator selected is capable of raising and lowering the height of the Musical Instrument Stand as disclosed and claimed herein.

The at least one actuator 11 is operatively connected to a control system that includes a control box element 13. In the present embodiment, the control box element is mounted onto the support frame 3. In yet other embodiments, the control box element 13 may be mounted at any location as required by the particular application. The control box element 3 provides power and control to the at least one actuator 11. In alternative embodiments, the functions of the control box element 13 may also include protection against overheating of any component of the Musical Instrument Stand A, reception of a signals from an external remote pad or smart phone for general control of the overall operations of the Musical Instrument Instruments Stand A, and programmability of upper and lower dimensional limits of the operation of the actuators.

It is appreciated that the at least one actuator 11 is capable of lifting and lowering the weight of the musical instrument and the Musical Instrument Stand A as needed to readily and smoothly increase or decrease the height of the musical instrument disposed upon the Musical Instrument Stand A. Embodiments of the present invention allow a performer to adjust the height of a musical instrument quickly and effortlessly to a precise repeatable performing height to within about 0.1 inch while also assuring the instrument is substantially horizontal.

It is also understood that the electrical power used to operate the control box element 13 can be provided by either electric battery means, electric inverter means, or by connection of the control box element to a plugin wiring system capable of providing the electrical power needed to properly operate the control box element and functionally operate the Musical Instrument Stand A.

In the embodiment disclosed in FIG. 2, two linear actuators 11 are used. It is understood that when the embodiment includes two linear actuators 11 mounted to each of two support legs 5, the control box element 13 controls the operation of each of the two linear actuators 11 to ensure that the two linear actuators are synchronized such that the functional operation of the two linear actuators raise and lower the musical instrument disposed upon the Musical Instrument Stand A at the same speed to achieve the same relative height of the musical instrument 1.

The control box element 13 includes operational elements such as limit switches that are positioned to signal the control box element when upper height limits and lower heights limits for each of the two linear actuators 11 are met. This prevents the Musical Instrument Stand A from being adjusted to an upper or lower height that could result in damage to the musical instrument 1 and/or the Musical Instrument Stand A or its components. In the present embodiment the upper and lower limits of operation are set by signals generated by a set of sensors disposed within the operational area of each of the two linear actuators 11. It will be appreciated that these upper and lower operational limits can be pre-programed to limit the performer's playing range.

In the present embodiment, the control system also comprises a control pad element 15. In this embodiment, the control pad element 15 is a separate physical element from the control box element 13 and the control pad element is mounted on the Musical Instrument Stand A at a different location from the control box element. It is understood that in other embodiments, the control pad element 15 may be combined with the control box element 13 to form a single physical element mounted at a single location to perform the functions of both the control box element and the control pad element.

The control pad element 15 provide a means for the operator to adjust the height of the Musical Instrument Stand A. In this embodiment, the control pad element 15 allows the operator to adjust the height of the instrument one of either up or down by activating a switch 17 operatively connected to the control pad element 15. It is noted that in certain embodiments of the present invention, the control pad element 15 includes at least one additional switch 17 that, when activated by the operator, signals the control box element 13 to automatically adjust the height of the Musical Instrument Stand A to at least one preset height. In yet other embodiments of the present invention, there are a plurality of additional switches 17 that are operatively connected to the control pad element 15 wherein each of the plurality of additional switches is functionally connected to a preprogrammed height for the Musical Instrument Stand A that is either the same or different than one of the other switches 17.

It is understood that while the embodiment of the present invention a shown in FIG. 2 incorporates pressure sensitive buttons as the switches 17, other types of switches may be used and still remain within the scope of the claims of the present invention. For example, the switches 17 may be membrane switches, mechanical pressure switches, toggle switches, lever switches, slide switches, or any other similar type of switch as long as the type of switch selected is capable of transmitting a signal from the control pad element 15 to the control box element 13 that results in the activation of the linear actuators to result in the adjustment of the height of the Musical Instrument Stand A.

Although the Musical Instrument Stand A can be used to support a variety of musical instruments that require different desired operating heights In one preferred embodiment, the functional dimensional operating range of the linear actuator 11 from fully retracted to fully extended is about 23.0 inches.

In the current embodiment, the Musical Instrument Stand A includes a set of wheeled castors 21 assembled onto the bottom portion of the support stand. This set of castors 21 allows the Musical Instrument Stand A to be readily moved from one position to another to set up the musical instrument for a single playing position or to allow the musical instrument to be moved during time the musical instrument is being played. The total height of the set of castors 21 in the current embodiment is between about 6.0 inches and about 10.0 inches in height. It is understood that the total height of the set of castors 21 used in other embodiments can be adjusted as needed to fit any particular application of the Musical Instrument Stand A and remain within the intended scope of the present invention.

While the present embodiment uses a set of wiring and cables 23 to interconnect the control box element 13, the linear actuators 11 and the control pad element 15, it is understood that in alternative embodiments the transmittal of signals and/or the operating power may be communicated between those components by either wired or wireless methods.

In yet other embodiments of the present invention, the control box element 13 and the preset heights of the Musical Instrument Stand A contained within the control box element can be set and changed through communications with a smart phone 19. The smart phone 19 includes an application that transmits and receives signals from an embodiment of the control box element 13 that wirelessly connects to the smart phone to allow wireless communications between the smart phone and the control box element. It is understood that the operator of the Musical Instrument Stand A can use the smart phone 19 to accomplish a plurality of tasks that include setting the preset heights of the Musical Instrument Stand A, selecting which preset height to which the Musical Instrument Stand A is to be adjusted, and other tasks that might be needed to allow the musician to manipulate the height of the Musical Instrument Stand A during a performance.

As one example, the control box element 13 could be programmed by the smart phone 19 to automatically change the height of the Musical Instrument Stand A during a single performance while the musician is playing the musical instrument 1 that has been mounted onto the Musical Instrument Stand A. In yet another example, the smart phone 19 might operate the control box element in a manner that allows the increasing or decreasing of the height of the Musical Instrument Stand A at varying speeds. Therefore, it is understood by those of skill in the art that the smart phone 19 can operate the linear actuators in a range of styles that can allow the performer to use the adjustability of the Musical Instrument Stand A in a wide ranging manner.

In other embodiments of the present invention, the Musical Instrument Stand A incorporates only one liner actuator 11. In this embodiment, the single linear actuator 11 is disposed on the support frame 3 in a manner and method that allows the single linear actuator to be operatively connected to the telescoping system 9 disposed on each of the two support legs 5. For example, in one embodiment, a single linear actuator 11 is centrally mounted on the support frame 3 such that the linear actuator is operatively connected to the telescoping system 9 via a system of rotating drive rod(s), bevel gears, and lead/ball screws. Yet other methods of transmitting the movement from the linear actuator 11 to the telescoping systems 9 may be used and still remain within the scope of the present claims. For example, the linear actuator 11 can transmit its movement to the telescoping system 9 through a chain system or a cable system. It is understood that any type of motion transference method may be used as long as the motion transference method selected is capable of transmitting the movement of the linear actuator 11 to the telescoping system 9 in such a manner that the height of the Musical Instrument Stand A can be adjusted as described and disclosed herein.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill. The scope of the invention should be determined by any appended claims and their legal equivalents, rather than by the examples given.

Additionally, it will be seen in the above disclosure that several of the intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "proximate," "distal," "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will also be understood that when an element is referred to as being "operatively connected," "connected," "coupled," "engaged," or "engageable" to and/or with another element, it can be directly connected, coupled, engaged, engageable to and/or with the other element or intervening elements may be present. In contrast, when an element is referred to as being "directly connected," "directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed is:

1. A musical instrument stand comprising:

a support stand comprising an upper frame configured to support a marimba or vibraphone in a stable horizontal orientation;

at least two actuators disposed on the support stand wherein the at least two actuators are one of either an electrical linear actuator, an alternating current linear electric actuator, a direct current linear electric actuator, an inline actuator, a right-angle actuator, a vertical lift actuator, and a gear motor actuator;

at least two telescoping systems operatively connected respectively to each of the two actuators, configured to increase or decrease a height of the support stand by synchronized operation of the at least two actuators;

a control box element for configured to communicate signals to the at least two actuators; and a control pad element operatively connected to the control box element wherein the control pad element communicates signals to the control box element to one of either select the height of the support stand or to select at least one of a preprogrammed height for the support stand.

2. The musical instrument stand of claim 1 wherein the support stand includes a support leg located at each end of an upper frame.

3. The musical instrument stand of claim 2 wherein the control box element routes power and control to the at least two actuators.

4. The musical instrument stand of claim 3 wherein the control box element is configured to provide protection against overheating of any component of the musical instrument stand.

5. The musical instrument stand of claim 3 wherein the control box element is configured to receive signals from a control pad element comprising one of either an external remote pad or a smart phone for general control of the overall operations of the musical instrument stand.

6. The musical instrument stand of claim 3 wherein the control box element includes programmability of one of either an upper dimensional limit for the at least two actuators or a lower dimensional limit of the operation for the at least two actuators.

7. The musical instrument stand of claim 6 further comprising a set of limiting operational elements positioned to provide signals to the control box element when one of either the upper dimensional limit and the lower dimensional limit for each of the at least two actuators is reached.

8. The musical instrument stand of claim 7 wherein the set of limiting operational elements includes limit switches.

9. The musical instrument stand of claim 8 wherein the operation of the telescoping system and each of the at least two synchronized actuators can repeatably adjust the musical instrument stand to a horizontal orientation at a previous height to within about 0.1 inch.

10. The musical instrument stand of claim 9 wherein the control pad element further comprises a first height switch operatively connected to the control pad element wherein the first switch manually controls dimensional height of the musical instrument stand.

11. The musical instrument stand of claim 10 wherein the control pad element further comprises a second height switch operatively connected to the control pad element wherein the second switch to signal the control box element to adjust the dimensional height of the musical instrument stand to at least one preset height.

12. The musical instrument stand of claim 11 wherein one of either the first height switch or the second height switch is one of either membrane switches, mechanical pressure switches, toggle switches, lever switches, or slide switches.

13. The musical instrument stand of claim 12 wherein the at least two actuators are configured to have a functional dimensional operating range of about 23.0 inches.

14. The musical instrument stand of claim 13 wherein a preset height of the musical instrument stand stored within the control box element can be set and changed through communications with an application installed on a smart phone.

15. The musical instrument stand of claim 14 wherein each of the two support legs of the support stand has an actuator.

16. A method of operating a musical instrument stand, comprising the steps of:

placing a musical percussion instrument in a horizontal orientation on the upper frame of a musical instrument stand recited in claim 3, generating a signal to the control box element so as to select a first height for the upper frame on which the musical percussion instrument has been placed, said first height being chosen to fit the particular height desired by a first musician playing the musical percussion instrument, the first musician performing on the musical percussion instrument for a desired period of time, and thereafter generating a signal to the control box element so as to select a second height for the upper frame, said second height being chosen to fit a particular height thereupon desired by the first musician or by a second musician about to play the musical percussion instrument.

17. The method of claim 16 wherein signals to the control box element are generated by a control pad element comprising one of either an external remote pad or a smart phone.

18. A musical instrument stand comprising:

a support stand comprising an upper frame configured to support a marimba or vibraphone in a stable horizontal orientation;

at least two actuators disposed on the support stand wherein the at least two actuators are respectively one of either an electrical linear actuator, an alternating current linear electric actuator, a direct current linear electric actuator, an inline actuator, a right-angle actuator, a vertical lift actuator, and a gear motor actuator;

at least one telescoping system is operatively connected to one of the at least two actuators to increase or decrease a height of the support stand upon operation of the actuators;

a control box element for communication of signals to each of the actuators;

a control pad element operatively connected to the control box element wherein the control pad element communicates signals to the control box element to one of either select the height of the support stand or to select at least one of a preprogrammed height for the support stand; and, wherein each of the actuators is operatively connected to synchronize operation of the telescoping system disposed on each respective support leg via at least one of either a system of rotating drive rods, a set of bevel gears, ball screws, a chain system, or a cable system.

* * * * *